US010294092B2

(12) United States Patent
Volftsun

(10) Patent No.: US 10,294,092 B2
(45) Date of Patent: May 21, 2019

(54) BEVERAGE DISPENSING SYSTEM

(71) Applicant: Lev Volftsun, McLean, VA (US)

(72) Inventor: Lev Volftsun, McLean, VA (US)

(73) Assignee: SESTRA SYSTEMS, INC., Sterling, VA (US)

( * ) Notice: Subject to any disclaimer, the term of this patent is extended or adjusted under 35 U.S.C. 154(b) by 0 days.

(21) Appl. No.: 15/332,117

(22) Filed: Oct. 24, 2016

(65) Prior Publication Data

US 2017/0096322 A1 Apr. 6, 2017

Related U.S. Application Data

(63) Continuation of application No. 14/686,820, filed on Apr. 15, 2015.

(51) Int. Cl.
*B67D 1/00* (2006.01)
*B67D 1/08* (2006.01)
(Continued)

(52) U.S. Cl.
CPC ............ *B67D 1/0007* (2013.01); *B67D 1/00* (2013.01); *B67D 1/0004* (2013.01); *B67D 1/04* (2013.01); *B67D 1/0406* (2013.01); *B67D 1/08* (2013.01); *B67D 1/0855* (2013.01); *B67D 1/0884* (2013.01); *B67D 1/12* (2013.01);
(Continued)

(58) Field of Classification Search
CPC ....... G01F 11/02; G01F 11/06; B67D 1/0045; B67D 1/107; B67D 1/0027; B67D 1/08; B67D 1/00; B67D 1/04; B67D 7/08; B67D 7/06; B67D 7/22; B67D 2001/075; B67D 2210/00089; B67D 2210/00118; B67D 7/80; B67D 1/0007; B67D 1/0004; B67D 1/0406; B67D 1/0855; B67D 1/0884; B67D 1/12; B67D 1/1247; B67D 1/1281; B67D 1/0888; B67D 1/0895
USPC ........... 222/129–137; 137/87.05, 98–101.21, 137/110–111
See application file for complete search history.

(56) References Cited

U.S. PATENT DOCUMENTS 3,283,957 A * 11/1966 Henderson .......... B01F 15/0416 137/101.21
3,370,759 A * 2/1968 Johansson ................. B65B 3/32 222/249
(Continued)

FOREIGN PATENT DOCUMENTS

GB 1342285 1/1794

OTHER PUBLICATIONS

Written opinion of the Internation Searching Authority for International Application No. PCT/US 16/27175.

*Primary Examiner* — Paul R Durand
*Assistant Examiner* — Andrew P Bainbridge
(74) *Attorney, Agent, or Firm* — John D. Gugliotta

(57) ABSTRACT

A system and method for the automated dispensing of bulk keg wine is provide having, in combination: integrated temperature control; pressure monitoring; automated purging; and integrated point of sale data acquisition for determining inventory usage statistics for each keg of wine dispensed. The system provides for precise measurement of each portion. An error alarm system warns an operator about beverage tank low level. A system for forcing the flashing of poor quality beverage. Recording of all delivery process events allows for operator or management review and control.

24 Claims, 18 Drawing Sheets

(51) Int. Cl.

| | |
|---|---|
| ***B67D 1/12*** | (2006.01) |
| ***B67D 1/04*** | (2006.01) |
| ***B67D 7/08*** | (2010.01) |
| ***B67D 7/80*** | (2010.01) |
| ***G01F 11/06*** | (2006.01) |
| *B67D 1/07* | (2006.01) |

(52) U.S. Cl.

CPC ......... *B67D 1/1247* (2013.01); *B67D 1/1281* (2013.01); *B67D 7/08* (2013.01); *B67D 7/80* (2013.01); *G01F 11/06* (2013.01); *B67D 1/0888* (2013.01); *B67D 1/0895* (2013.01); *B67D 2001/075* (2013.01); *B67D 2210/00089* (2013.01); *B67D 2210/00118* (2013.01)

(56) References Cited

U.S. PATENT DOCUMENTS

| | | | | | |
|---|---|---|---|---|---|
| 3,552,606 | A | | 1/1971 | Kraft et al. | |
| 3,735,898 | A | * | 5/1973 | Smith | B67D 1/06 222/129 |
| 3,830,405 | A | | 8/1974 | Jaeger | |
| 4,008,984 | A | * | 2/1977 | Scholle | F01L 21/02 417/393 |
| 4,554,939 | A | * | 11/1985 | Kern | C02F 1/686 137/101.21 |
| 4,779,761 | A | * | 10/1988 | Rudick | B67D 1/0027 222/1 |
| 4,818,191 | A | * | 4/1989 | Schlake | F01L 25/08 417/390 |
| 4,901,886 | A | * | 2/1990 | Kirschner | B67D 1/1234 222/1 |
| RE33,222 | E | * | 5/1990 | Zebuhr | F24D 17/00 126/374.1 |
| 5,121,855 | A | * | 6/1992 | Credle, Jr. | B67D 1/0044 137/99 |
| 5,179,970 | A | * | 1/1993 | Jarocki | B67D 1/0855 137/607 |
| 5,181,631 | A | * | 1/1993 | Credle, Jr. | B67D 1/0027 141/362 |
| 5,381,926 | A | * | 1/1995 | Credle, Jr. | B67D 1/0032 222/1 |
| 5,588,813 | A | * | 12/1996 | Berke-Jorgensen | B67D 1/107 417/391 |
| 5,881,919 | A | * | 3/1999 | Womac | B05B 7/0425 222/136 |
| 6,435,375 | B2 | * | 8/2002 | Durham | B67D 1/0032 222/129.1 |
| 6,792,965 | B2 | * | 9/2004 | Kunkler | F15C 3/06 137/100 |
| 6,840,404 | B1 | * | 1/2005 | Schultz | B01F 15/0466 222/137 |
| 8,463,447 | B2 | * | 6/2013 | Newman | B67D 1/0021 700/283 |
| 8,479,955 | B2 | | 7/2013 | Vesborg et al. | |
| 10,125,002 | B2 | * | 11/2018 | Volftsun | B67D 1/0007 |
| 10,167,183 | B1 | * | 1/2019 | Volftsun | B67D 1/102 |
| 2002/0113087 | A1 | * | 8/2002 | Ziesel | B67D 1/0007 222/129.1 |
| 2005/0072800 | A1 | * | 4/2005 | Smith | B67D 1/104 222/129.2 |
| 2007/0069046 | A1 | * | 3/2007 | Eini | B65D 83/68 239/418 |
| 2008/0189078 | A1 | | 8/2008 | Vok et al. | |
| 2008/0202148 | A1 | | 8/2008 | Gagliano | |
| 2010/0089943 | A1 | * | 4/2010 | Till | B67D 1/0884 222/1 |
| 2012/0279987 | A1 | * | 11/2012 | Ophardt | A47K 5/1205 222/23 |
| 2015/0027665 | A1 | | 1/2015 | Cooke | |
| 2016/0257549 | A1 | * | 9/2016 | Volftsun | B67D 1/0007 |

* cited by examiner

BEVERAGE DISPENSING SYSTEM

RELATED APPLICATIONS

The present invention is a Continuation in Part of U.S. Ser. No. 14/686,820 (also filed as PCT/US16/27175) and further claims benefit of U.S. Provisional Application 61/979,118 filed on Apr. 14, 2014 for a Wine Service and Dispensing Cart, and U.S. Provisional Application 62/023,899 filed on Jul. 13, 2014, all of which are incorporated by reference as if fully rewritten herein. There are no other previously filed, nor currently any co-pending applications, anywhere in the world.

BACKGROUND OF THE INVENTION

1. Field of the Invention

The present invention relates to a system and method for dispensing beverages in a hospitality or other commercial setting, as well as in residential or consumer applications, and, more particularly, to the measurement of, automated pour control, and metered dispensing of beverages under pressure.

2. Description of the Related Art

Recent demographic changes are modifying the pattern of consumption in adult beverages throughout the United States. The Millennial generation (also known as Millennials or Generation Y) are the demographic cohort following Generation X. There are no precise dates when the generation starts and ends, but it is commonly identified as those birth years ranging from the early 1980s to the early 2000s, which includes the youngest legal drinkers. This social cohort are consuming more wine than previous generations when they turn legal drinking age. As a result, wine makers and distributors across the U.S. are seeing both more overall demand, as well as a change in the types of wine they produce. Other changes include the packaging used, as well as market tools to connect their brand with their customers.

One area where this demand is currently placing pressure on current beverage distribution systems is at outdoor events and event venues such as stadiums, arenas and high volume entertainment facilities Beverage delivery of prior preferred beverages has evolved to include bulk containers, distribution tubes or hoses, and dispensing taps or fountains. This can be seen in the delivery of first soft drinks, and then beer.

Because of the nature of soft drinks, technology was adapted to satisfy the post mixing of syrup, water and carbon dioxide in bulk distribution to satisfy dispensing of soft drinks in a manner currently efficient enough for mass venues. As beer became an adult beverage of choice of the prior demographic cohort, technology was adapted to eventually satisfy the cleaning, delivery, dispensing and changing of bulk keg beer products. However, these prior bulk beverage delivery systems do not lend themselves directly to the dispensed delivery of wine. Additionally, no existing systems exactly measure the volume of beverages they dispense, but rather make approximations based on weight and/or time. Such approximations lack sufficient precision and can lose their calibration over time.

Beer and wine contain alcohol, and as such are carefully regulated and their distribution carefully controlled and taxed. Further, unlike beer and soda, wine is typically poured to fill only half the glass, rather than the entire glass. Consequently, there is a high tendency to "over pour" and controlled and consistent metering of individual servings is highly desired by the retail vendor to minimize and eliminate such "over pouring". While similar motivations exist for beer, due to the carbonated nature of beer products the amount of waste or commercial spoilage is quite different. Consumers tend to place a lot of importance on beer heads: too much of a head is undesirable because it detracts from the mass of the drink (similar to carbonated soda drinks). But, on the other hand, a beer drink is viewed as incomplete unless it has some head, and there is an expectation of a specific form of head based on the type of beer. Consequently, the automated metering, monitoring and control of beer beverage dispensing currently already estimates between a 5%-15% allocation or credit to accommodate for the inability to exactly meter the liquid and its associated foam.

However, the problem associated with the metering of an "exact" pour is exaggerated, and quite different, with wine. Wine does not foam. Wine has a higher tax value. Wine has a smaller serving size. And, wine is served in stemware in which the cup or bowl is served only partially filled. As an example, a wine glass as defined by the International Standards Organization (ISO) has a capacity of approximately 215 ml, but it is intended to take a 50 ml pour. While other types of wine stemware have differences in shape and size, generally such drink ware lend themselves easily to "over pouring", or dispensing serving amounts in excess of a desired standard. Such overages in the dispensing of wine can easily reach up to between 25%-50%.

Consequently, the need to provide a standardized beverage dispensing system particularly adapted for use in dispensing metered volumes of wine is needed.

"Wine on Tap" is a distribution method for wine that has been developed for high volume dispensing and service applications. However, at an extreme event, such as a professional baseball event servicing 10,000-20,000 spectators, or a professional football event servicing 40,000-60,000 spectators, or a professional soccer event servicing upwards of 100,000 spectators all at a single venue, such systems still exhibit problems associated with consistency of pour, while providing ease of line cleaning and simplicity of keg changeover. In such systems, a typical process of delivering beverage to the customer is controlled by an operator (bartender) through a manual interface. The operator is responsible for the quality and the volume of each portion. For beverages that tend to oxidize, such as wine, the operator is supposed to flash (discharge to waste) one or several portions of the beverage from the delivery line before supplying the good portion to the customer. This manual system relies on the operator only and does not guarantee neither the quality nor the consistency of the required volume size of the beverage portion.

It is preferable that in a beverage dispensing and pour control system for use with keg wine or other bulk regulated beverage management should have the ability to control the quality and quantity of servings delivered by the operator. The suggested beverage dispensing and pour control system should also provide precise measurement of each portion—not imprecise measurements based on time or weight. Further, such a beverage dispensing and pour control system should warn the operator about beverage tank low level, allow for force flashing of the poor quality beverage and record all the delivery process events in the log for the management.

SUMMARY OF THE INVENTION

It is thus an object of the present invention to provide for more efficient beverage services for home, bars, restaurants or event venues.

It is another object of the present invention to provide a device, system and method for enabling the metered dispensing of any beverage which comes from pressurized containers.

It is yet another object of the present invention to deliver alcoholic or other beverages on tap and in a metered fashion.

It is still another object of the present invention to provide the delivery of such beverages as a continuous series of metered volumes delivered as an uninterrupted fluid flow.

It is further still an object of the present invention to provide an automated beverage dispensing system that controls the standardized unit dispensing in the use of alcoholic beverage on tap delivery.

It is still a further object of the present invention to provide a bulk beverage control system that may deliver multiple different beverage types with each being able to be delivered at an appropriate service temperature.

The present application provides an automated beverage dispenser for dispensing a beverage into a drinking vessel. The automated beverage dispenser may include a user interface for operating a metering mechanism. The metering mechanism may have the ability to measure an exact amount of liquid to be dispensed through the dispensing of a continuous series of smaller metered sub-volumes that are delivered as an uninterrupted fluid steam. In conjunction with such electronic controls, the addition of data acquision may further be incorporated to record the information on a permanent [magnetic] media. Sensor[s] may be included for measuring the number of units poured. Additional sensor(s) may further measure various operational parameters, such as, inter alia, beverage pressure in the delivery line, and various times (of operation, since product changeover, of peak usage, etc.). A system of communication further allows for information exchange between the metering mechanism and the user interface. The communication system may include an LCD, a keyboard, a mouse, or even interaction through sequence of blinking lights and buttons. The beverage dispenser may further include wireless communication capability to communicate with a standard PC or smartphone using the wireless protocol (such as Bluetooth, Wi-Fi, Internet, etc.). Bulk beverages from a number of sources can be metered upon demand as urged through a metering chamber of an identified volume by a single system pressure from fluid communication with the bulk beverage container. With such functionality accurate (rather than estimated) dispensed volume of various beverages may be logged and reported. In such a manner and with such a system, quality and quantity control can be easily accomplished, tracked and reported.

An advantage of the present invention is that is can be adapted for use in the bulk service distribution of precise individual volumes of any beverage, including alcoholic beverages, whether wine, beer, hard liquor or mixed cocktails.

It is another advantage of the present invention to provide for operational functionality utilizing line pressure for dispensing determined volumes, not electrically generated pressure (i.e. dispensing is based upon the existing pressure of the bulk keg beverages, rather than from electrically generated pumping pressure.

It is a further advantage of the present invention to provide for modular or quick plug-in component connections to allow for changing bulk beverage containers.

It is yet a further advantage of the present invention to provide for variations in dispensing volumes through the movement of a pistons.

It is a further advantage that determined volume changes may be further implemented through dispensing the displacement of partial piston cycles, multiple piston cycles, or a combination of each.

Further, the present invention provides a system of valves that are synchronized to work in existing line pressure between each two end of the container without changing or adding in-line pressure. By accommodating and accounting for fluid shoot-through of the vales a constant system pressure may be maintained while providing a continuous stream of dispensed fluid that may be formed of multiple discrete piston displacement cycles.

Further still, the elements of the present invention may be easily adapted for additional applications having more than a single input or for mixing liquids within the metering chamber for subsequent dispensing of a mixed beverage.

The present invention may be further adapted with a transmitter (Infrared, RF, magnetic, magnetostrictive or other technologies) incorporated into the piston or container in spaced specific intervals corresponding to a desired set measurement unit (e.g. 1 oz. increments) such that calculation of different volumes may be accomplished through movement of the piston along intervals along the chamber.

The present invention may be further adapted such that the piston may further be moved along a partial interval along the chamber such that a fractional volume portion (e.g. ½ oz. increments).

These and further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation. It should be further apparent to a person having ordinary skill in the relevant art, in light of the present teachings, that the discussed enablement being described for use with bulk wine should be considered equivalent for use with any other beverages.

Figure 1:
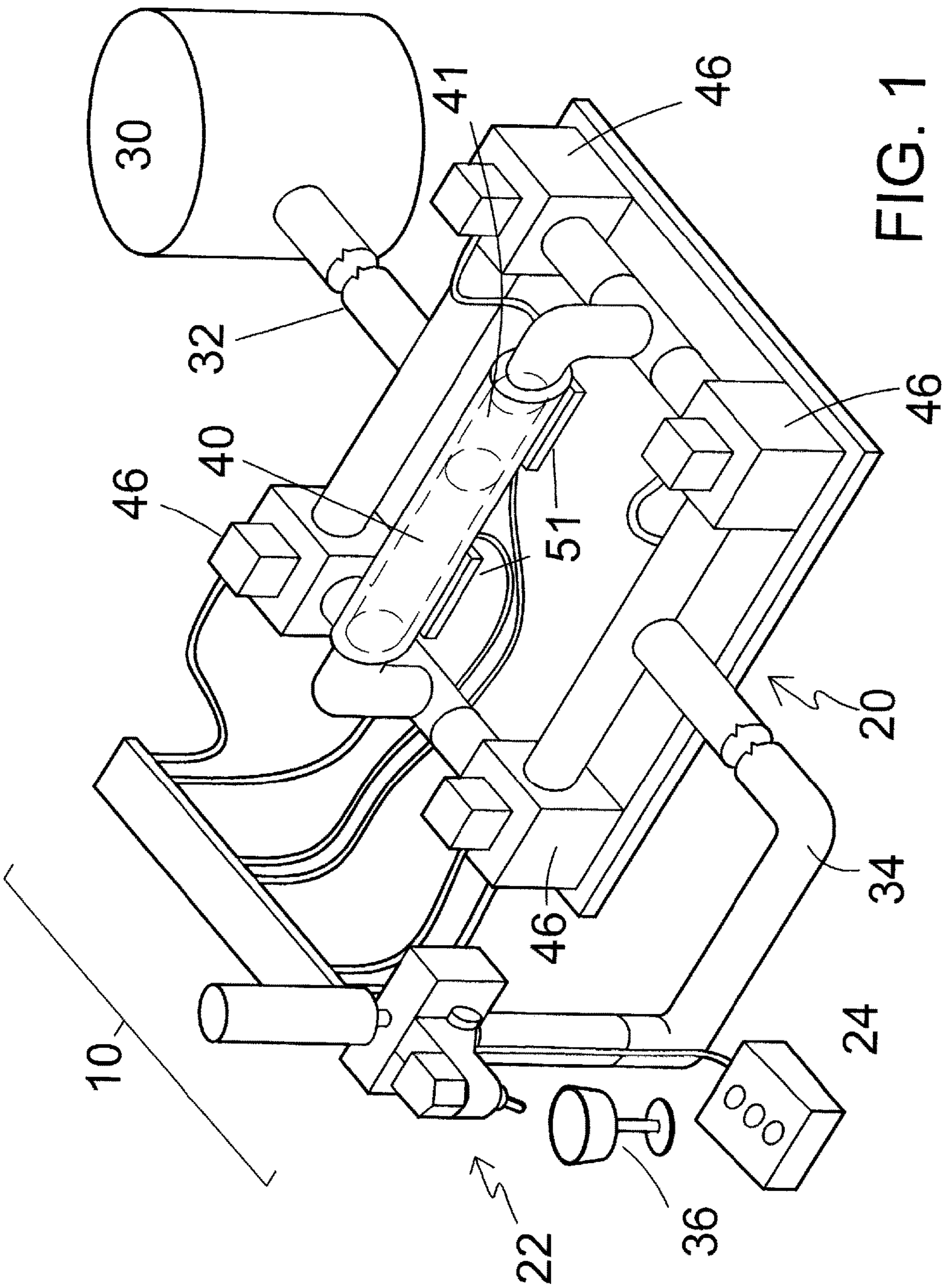
FIG. 1 is a perspective schematic view of a beverage dispensing and pour control system 10 for use with a metering system 20 according to an exemplary preferred embodiment of the present invention.

Referring now to FIG. 1, a perspective schematic view of a beverage dispensing and pour control system or "system", generally noted as 10, is shown as may be described herein. The system 10 may include: a metering mechanism 20; a tap or spigot 22; and a beverage bulk storage and distribution system 30. Generally, the metering mechanism 20 is in fluid communication with a beverage supply 32 in operative connection with the bulk storage and distribution system 30. The metering mechanism 20 also provides for a metered discharge 34 in fluid communication with the tap or spigot 22 in a manner that provides for a beverage specific controlled metered pour into a beverage container 36, as will be described in greater detail below.

Figure 2:
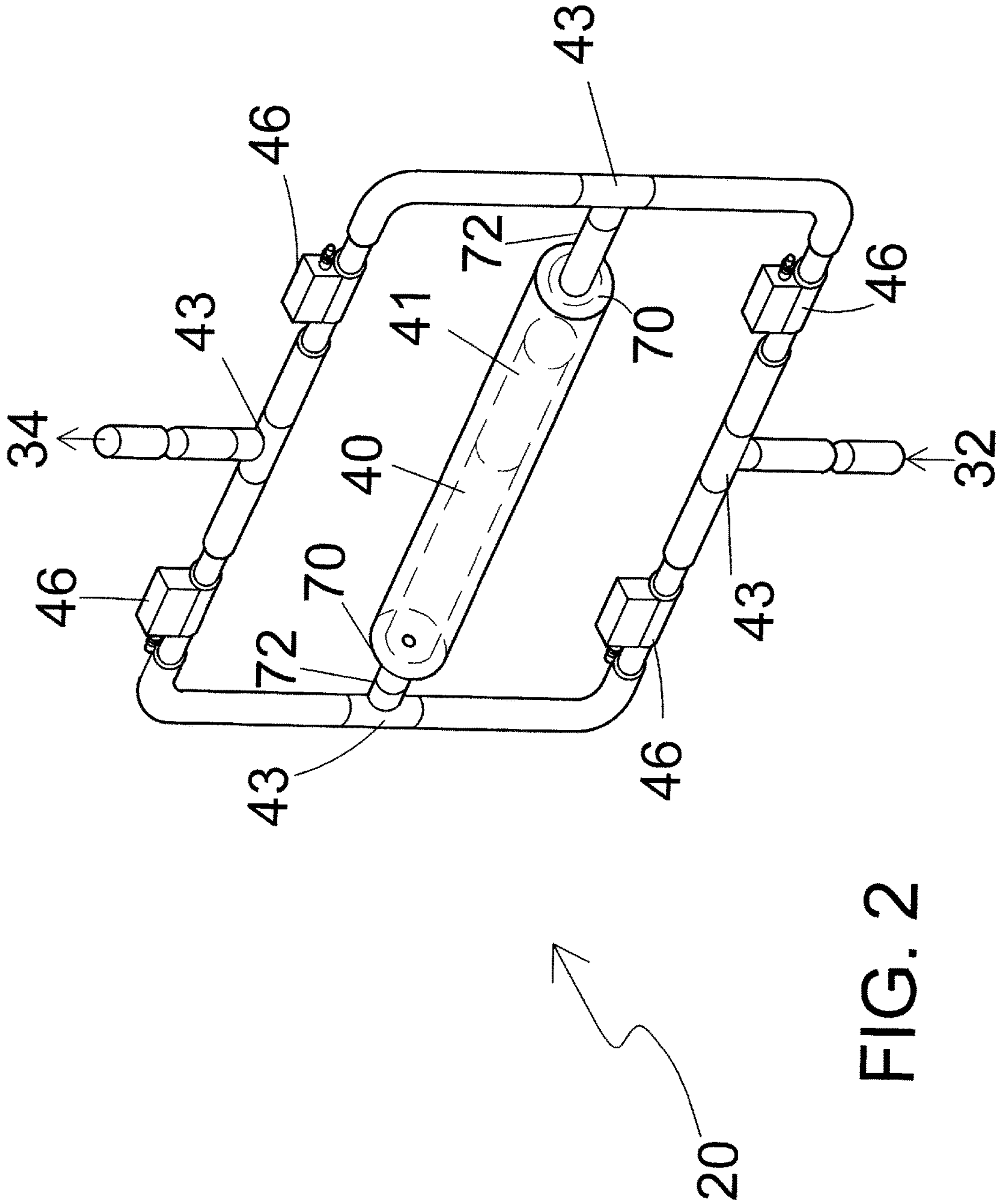
FIG. 2 is detailed perspective view of the hydraulic components of a metering system 20 for use in the beverage dispensing and pour control system 10 of the present invention.
Figure 3:
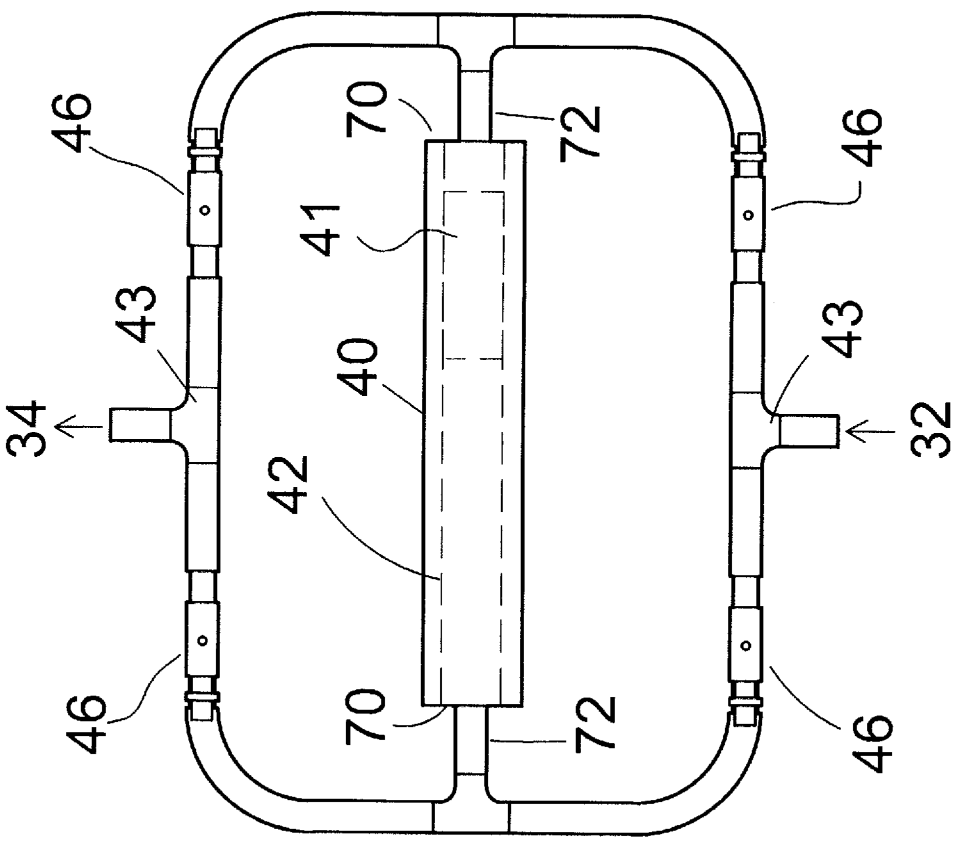
FIG. 3 is a top plan view of the metering system 20 of FIG. 2.

Referring now in conjunction with FIG. 2-3, a preferred embodiment of a metering mechanism 20 for use in the beverage dispensing and pour control system 10 of the present invention is shown in greater detail. The metering mechanism 20 includes a metering chamber 40 that functions as a line pressure powered bi-directional dispenser by redirecting the pressure from one end of the chamber to the other end. Such a chamber 40 allows for accurate, repeatable metering, utilizing and preserving line pressure without the inclusion of an additional pumping device. A piston 41 within the chamber provides a displacement urging force by shuttling back and forth within the chamber 40 according to directed fluid pressure. Such operation will be described in greater detail below.

The metering mechanism 20 further interfaces in electronic communication and control with a user interface 24 providing in combination for operational control of the metering mechanism 20 for delivering a metered volume of liquid to the tap 22 in a control, contiguous manner. As would be apparent to a person having ordinary skill in the relevant art, such a user interface 24 may include many types of communication systems for control of the system 10. These may include a visual (video) display, a keyboard, a mouse, and the like. As presently shown, an exemplary user interface 24 is shown simply as a series of operator manipulated buttons, with interactions visually validated through sequences of blinking lights. The metering mechanism 20 may further include wireless communication capability to communicate with a standard PC or smartphone using the wireless protocol (such as Bluetooth, Wi-Fi, Internet, etc.).

Bulk beverages from a number of sources 30 may be metered upon demand as urged through the metering chamber 40. Each cycle of the piston 41 may be correlated to an identified volume by a single system pressure generated from fluid communication with the bulk beverage container 30. This eliminates the need to provide an estimated dispensed volume of various beverages. With such operational characteristics, the present system 10 may provide a unique quality and quantity control can be easily accomplished, tracked and reported.

Figures 4, 5:
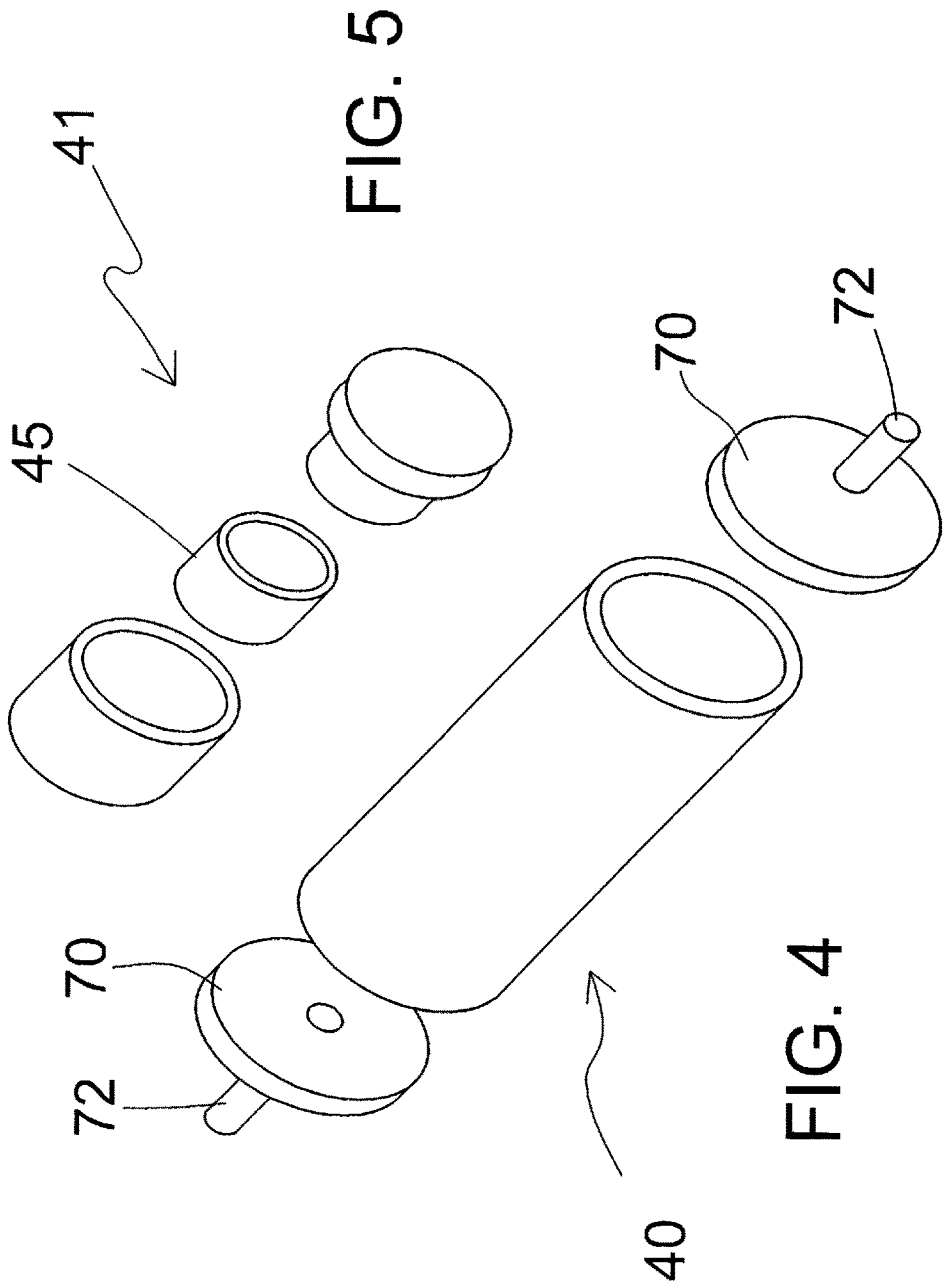
FIG. 4 is an exploded perspective view of a metering cylinder 40 for use within the metering system 20 of FIG. 1-3.
FIG. 5 is an exploded perspective view of a piston 41 for use in conjunction with the metering cylinder 40 of FIG. 4.
Figure 6:
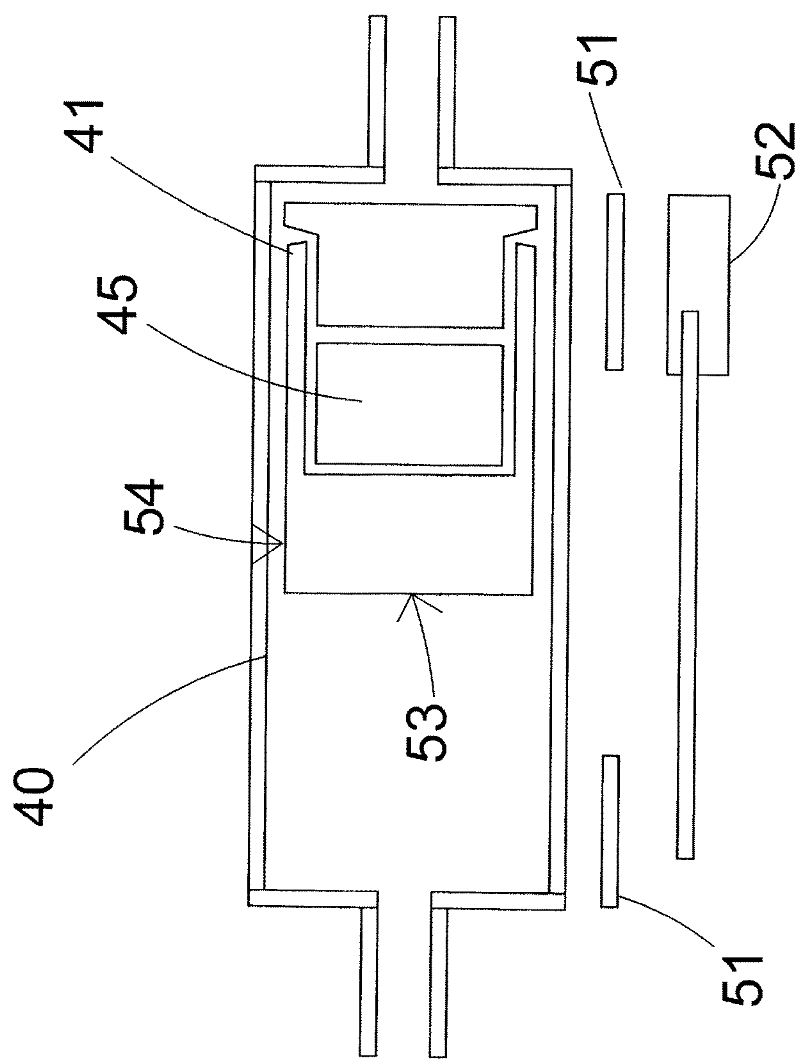
FIG. 6 is a cross sectional view of the metering cylinder 40 taken along line VI-VI of FIG. 3.
Figure 7:
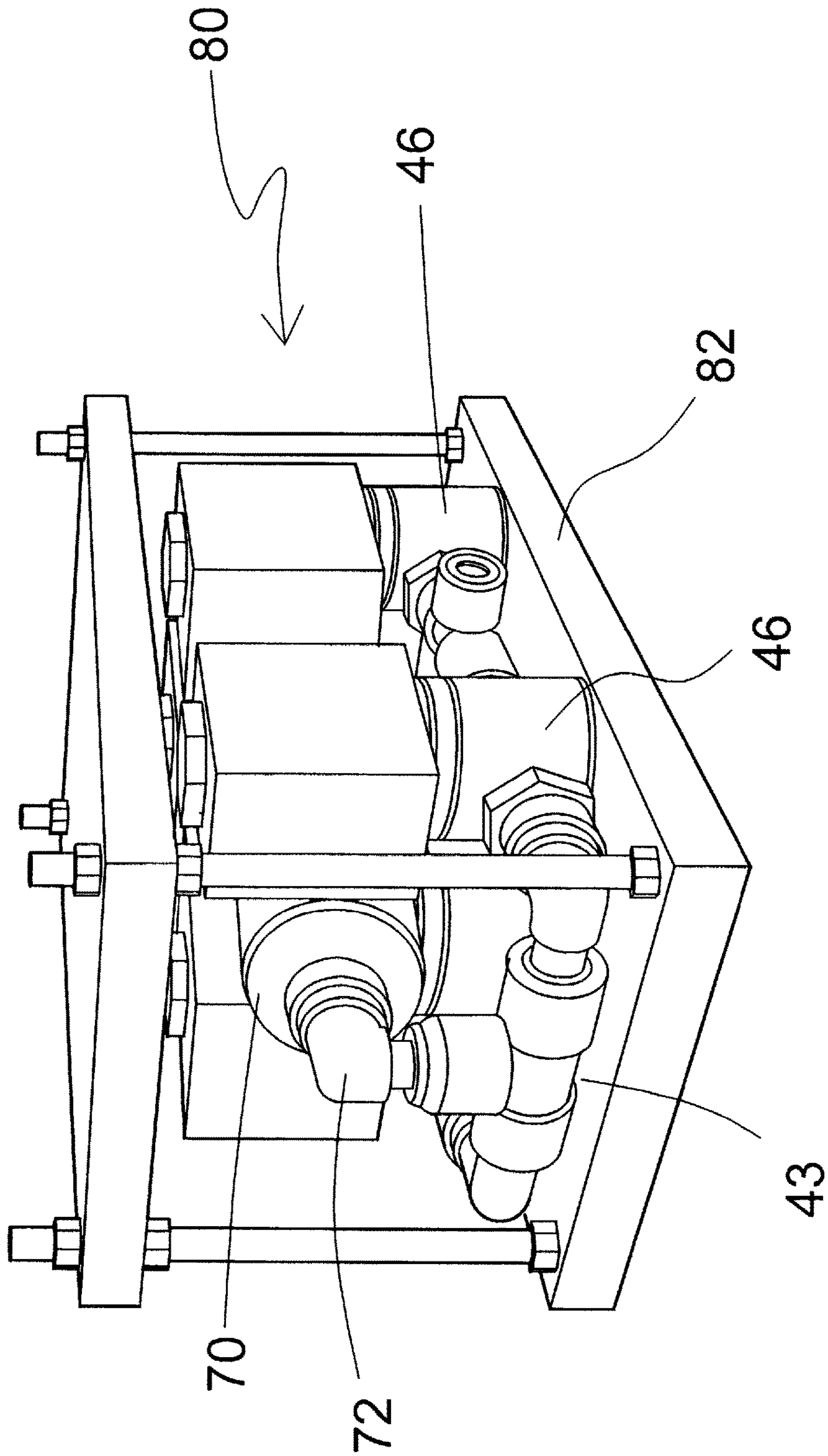
FIG. 7 is a perspective view of the metering system 20 formed in a modular assembly according to a first configuration and incorporating the present invention.
Figure 8:
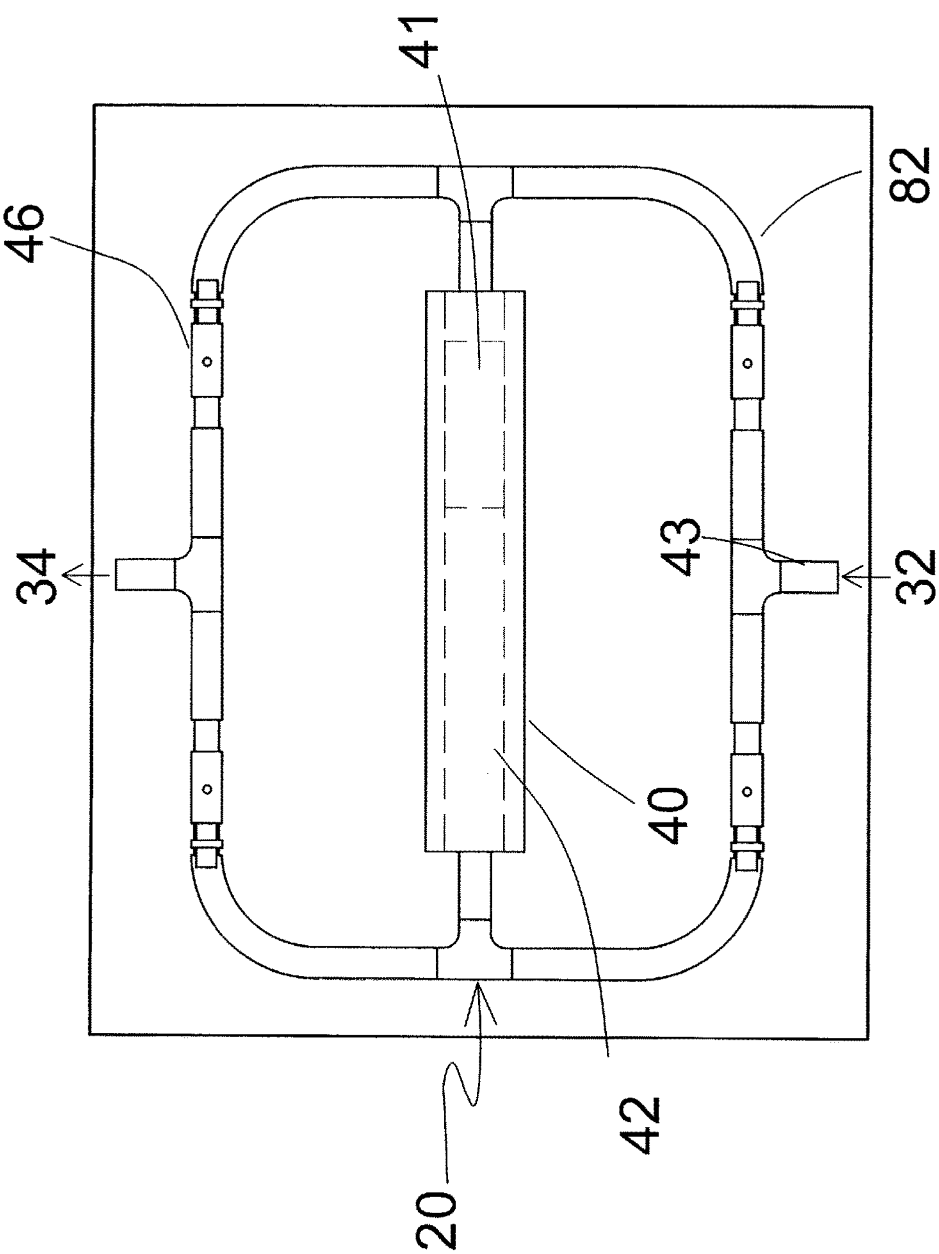
FIG. 8 is a top plan view thereof.
Figure 9:
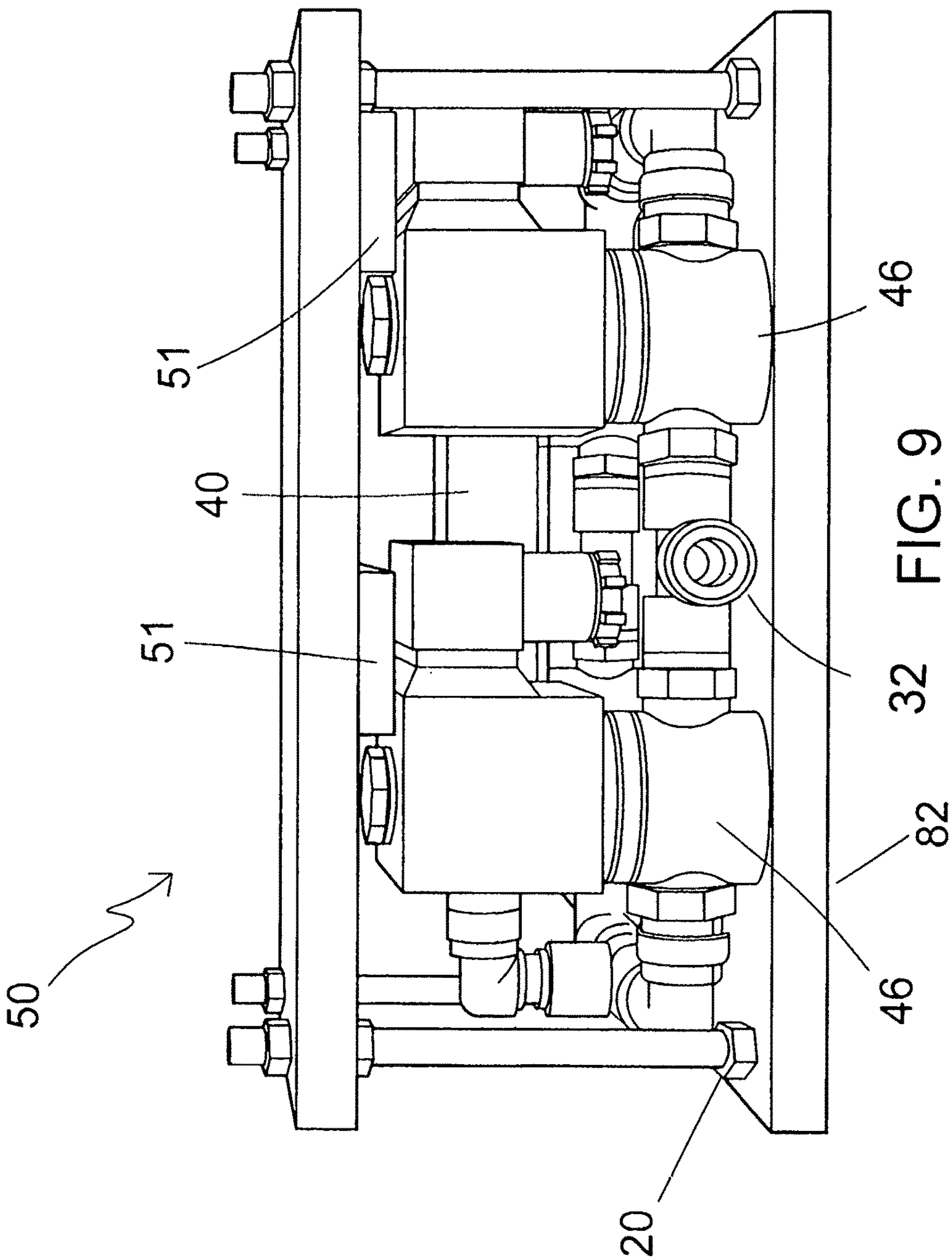
FIG. 9 is a side elevational view thereof.
Figure 10:
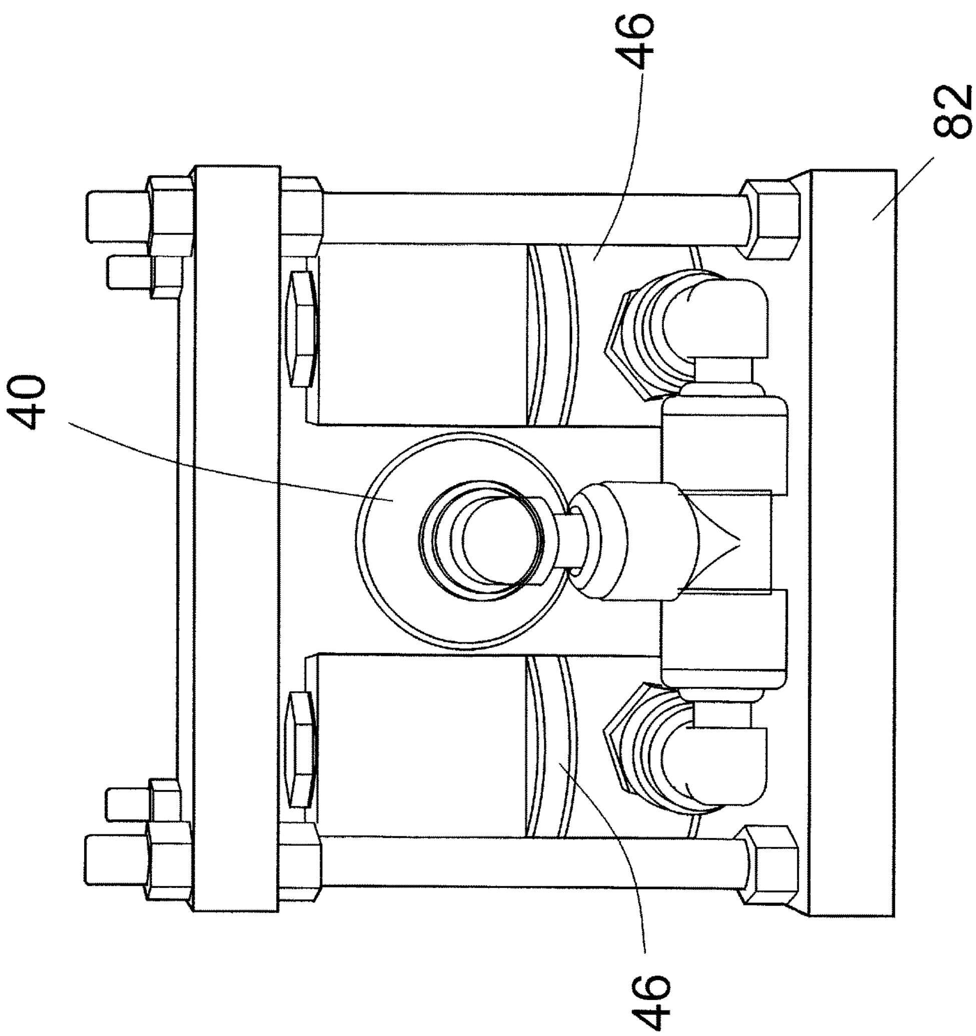
FIG. 10 is a front elevational photograph thereof.

Referring now further in greater detail in conjunction with FIG. 4-6, the chamber 40 is shown in greater detail as provided in the form of a cylinder having a selected, defined internal volume 42. The chamber 40 is shown embodied as a cylindrical container; however, it should be noted that such a shape and configuration is not intended to be limiting to the present invention. As will be described in greater detail below, according to an aspect of the present invention the defined volume may be equal to the volume of a component of a desired beverage pour plus the volume associated with the piston 41. This allows for a determined displacement for each piston cycle or partial piston cycle. Further, according to another aspect of the present invention fractional component of the volume of a desired beverage pour can be accomplished by tracking with sensors (51 or 52 as described below) and stopping the piston 41 at the appropriate location within its path within the piston 40. This facilitates use with mixed or blended drinks. Further still, according to yet another aspect of the present invention the defined discharge volume may be equal to a fraction of, or multiples, or a combination thereof of a piston stroke, thereby allowing for multiple dispenses from each reciprocating cycle.

The internal volume 42 houses and contains a piston 41 adapted to match the cross sectional shape of the chamber 40. The piston 41 freely moves laterally, as urged, in a reciprocating manner about the internal volume 42. As shown in greater detail in conjunction with FIG. 4-6, the free floating piston 41 incorporates a pair of parallel, flat face surfaces 53 and a peripheral sealing surface 54. As should be apparent to a person having ordinary skill in the relevant art, while the piston 41 must move freely within the chamber 40, it must further be formed of sufficiently tight enough tolerances to prevent leakage that could otherwise create an error is determining any specifically dispensed volumes. As necessary, the face surfaces 53 or sealing surface 54 may include a surface sealing mechanism, such as, for example, a ring seal channel or channels that contain and an elastomeric ring type seal.

The chamber 40 is sealed at each opposing end, shown herein by an end flange 70. Each end flange 70 may be attached, through adhesion or sonic welding, to contain the piston 41 inside the chamber 40 to allow it to shuttle between each opposed egress port 72. The piston 41 itself may further incorporate a sensor target 45, such as a magnet, for detection by appropriate sensors. Such monitoring can thereby allow calculation and control of dispensed volumes. It should be apparent to a person having ordinary skill in the relevant art, in light of the present teachings, that such a configuration for the chamber 40 is merely exemplary, and that a variety of configurations may be employed that provide an equivalent element functionality.

As described above, the metering mechanism 20 provides for a fluid communication input from the beverage supply 32, and a fluid communication discharge to the metered discharge 34. According to a preferred embodiment of the present invention, an input 32 is in connection with the beverage supply further includes a flow splitter 43 that directs a flow conduit to each egress port 72. Similarly, an outlet 34 is in connection with the metered discharge 34 and further includes a similar flow splitter 43 that directs a flow conduit from each egress port 72. Switching valves 46 operatively connected between the input 33, outlet 44 and metering cylinder 40 in order to provide alternating and symmetric flow paths through the metering cylinder 40. As should be apparent to a person having ordinary skill in the relevant art, in light of the present disclosure, the particular arrangement of valves and flow splitters may be adapted to a number of configurations, as long as existing line pressure is maintained while flow is alternately redirected between the opposite sides of the chamber 40 without changing or adding the pressure setup in-line. By way of example, and not as a limitation, alternate configurations may be accomplished with 2-way valves; 3-way valves; 4-way valve; or an equivalent manifold configuration incorporating another means of redirecting pressure.

As shown in FIG. 6, the metering cylinder 40 may further include a sensor or a number of sensors for identifying and determining the characteristics of the motion of the piston 41. This may be speed, location, position, direction or the like. Sensors 51 such as IR proximity sensors may detect the presence of the piston 41. Sensors 51 such as Hall Effect sensor may detect the presence of the target 45, herein a magnet, between cycles. While shown with sensors at each end of the metering chamber 40, any number of sensors may be so used to provide incremental detection along the linear length of the chamber 40. A magnetostrictive sensor 52 may alternately be used to continuously detect the position of the piston 41.

As shown in conjunction with FIG. 7 through FIG. 10, design configuration forming a discrete operational module is shown embodying the design, function, teachings and features of the metering mechanism 20 of the present invention. As shown herein, the metering mechanism 20 is provided in a modular block 80 and affixed to a mounting plate 82. As will be described in greater detail below, the modular block 80 may be subsequently configured and assembled to provide a plurality of metering mechanisms 20 in a vertically stacked arrangement that would provide for multi-line flow metering, while maintaining a compact form factor that is adapted for the systems particular use, namely, within tight or limited quarters provided by conventional concessions stands, bars, or other beverage dispensing environments about public venues.

Figure 11:
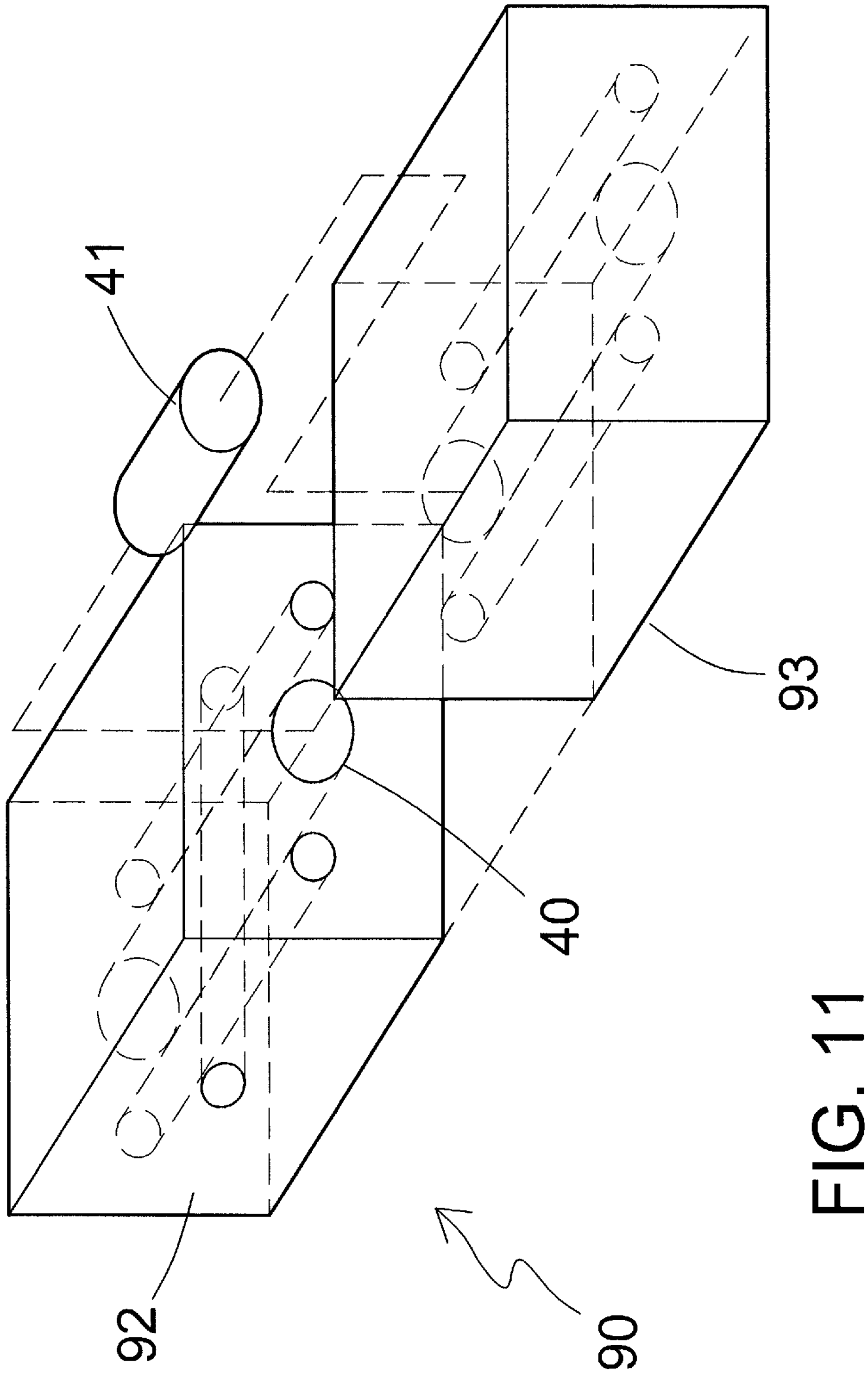
FIG. 11 an exploded perspective view of the metering system 20 formed in an integrated manifold assembly according to a second configuration and incorporating the present invention.
Figure 12:
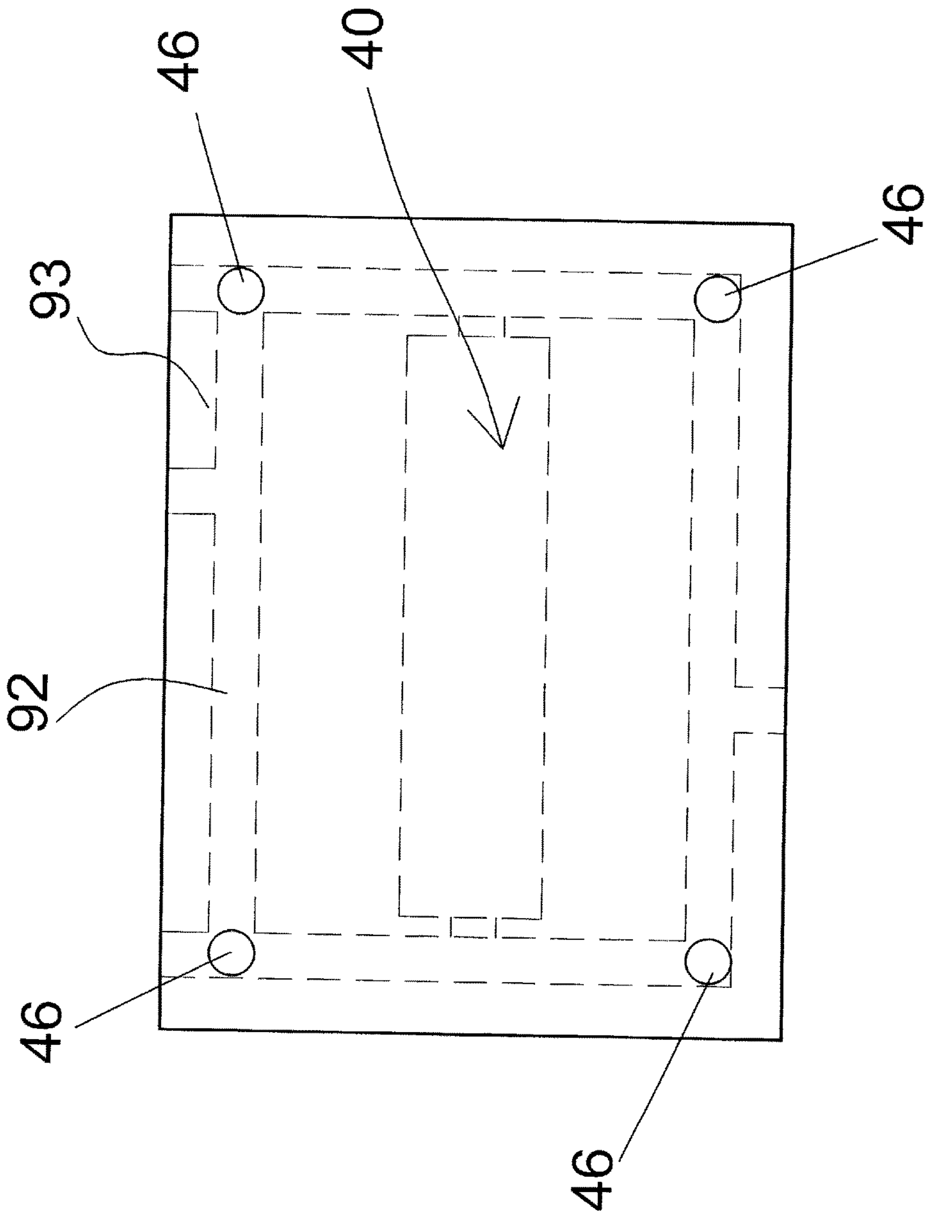
FIG. 12 is a top plan view thereof.

It should be noted that the above described configurations and examples are provided for enabling a preferred embodiment, but are not intended to be comprehensive or limiting. It should be apparent to a person having ordinary skill in the relevant art, and especially those in the hospitality industries in which the commercial dispensing of regulated beverages in medium, large or outdoor live hospitality venues, that the particular configurations may vary from those examples provided, but that such variation should be considered within a broad scope of equivalents that is and is intended to be within the present invention. Adaptations in hydraulic flow path or electrical control schema would be foremost considered as with such range of equivalents. However, such adaptations should not be considered exhaustive in that other variations or adaptations may be included while still incorporating the key aspects of the present inventive function. By way of example, and not intended as a limitation, one such adaptation may include the incorporation of a metering chamber 40, fluid conduits and control valves all incorporate into a solid manifold 90, as shown in conjunction with FIG. 11 through FIG. 12. Forming the module as a manifold 90 may prevent leakage or other quality issues, as well assist in easier manufacturing. Shown as a pair of mating solid blocks 92, 93, the metering chamber 40 and a flow conduits may be drilled directly therein (or molded in place during formation). Having a metered volume 42 in a greater quantity or multiple of an intended dispense pour volume such that numerous dispensed volumes may be provided within each bidirectional stroke of the piston 41.

Another similar adaptation may include the incorporation of a metering chamber 40 having a metered volume 42 in a fractional quantity of an intended dispensed pour volume, such that the automation of accurately blended multi-component cocktails may be accomplished through an integrated multi-line pour control system incorporating broadly the present teachings and features.

While is should be understood that the following additional feature are not a necessary core functionality of the present invention, a further adaptation of the present invention may further include in combination the ability to provide a bulk beverage control system that may deliver multiple different beverage types with each being able to be delivered at an appropriate service temperature. By way of additional detail, for example, when it comes to serving temperature it is commonly accepted that a wine has an appropriate service temperature: if too warm the wine's alcohol will be emphasized, leaving it flat and flabby; and, if too cold the aromas and flavors will be muted and, for reds, the tannins may seem harsh and astringent. General guidelines for appropriate service temperatures include:

Light dry white wines, rosés, and sparkling wines being served at between 40° to 50° F.;

Full-bodied white wines and light, fruity reds being serve at between 50° to 60° F.;

Full-bodied red wines and Ports being served at 60° to 65° F.

Further still, beers may be considered best if served either warmer or colder (depending upon type and cultural preference) and mixed cocktails are generally considered best if served colder. In order to accommodate such a variation in service temperatures the present invention may accommodate such differences based upon beverage dispensed by providing a chilled beverage input to the metering system at the coldest temperature within the range, in addition to subsequently heating the dispensed beverage back to within a preferred temperature range. This post-heating may occur at the metering system discharge or directly at the tap and can be done easily through piezoelectric heating of the dispensed metered liquid. By way of further clarifying example, if both red and white wine are dispensed, by storing or chilling the metering volume to between 40° to 50° F., and post heating just the red wines to be between 50° to 60° F., or to between 60° to 65° F. for fully body reds or ports, the proper service temperature may be accomplished automatically through a common bulk dispensing system.

As part of and in addition to the control of the quality and quantity of servings delivered by an operator, a beverage dispensing and pour control system 10 may provide precise measurement of each portion, warn the operator about beverage tank low level, force flushing of the poor quality beverage and record delivery process events in a log for use by management. The functions and operational characteristics may be further seen in conjunction with the examples described herein below.

2. Operation of the Preferred Embodiment

Figure 13:
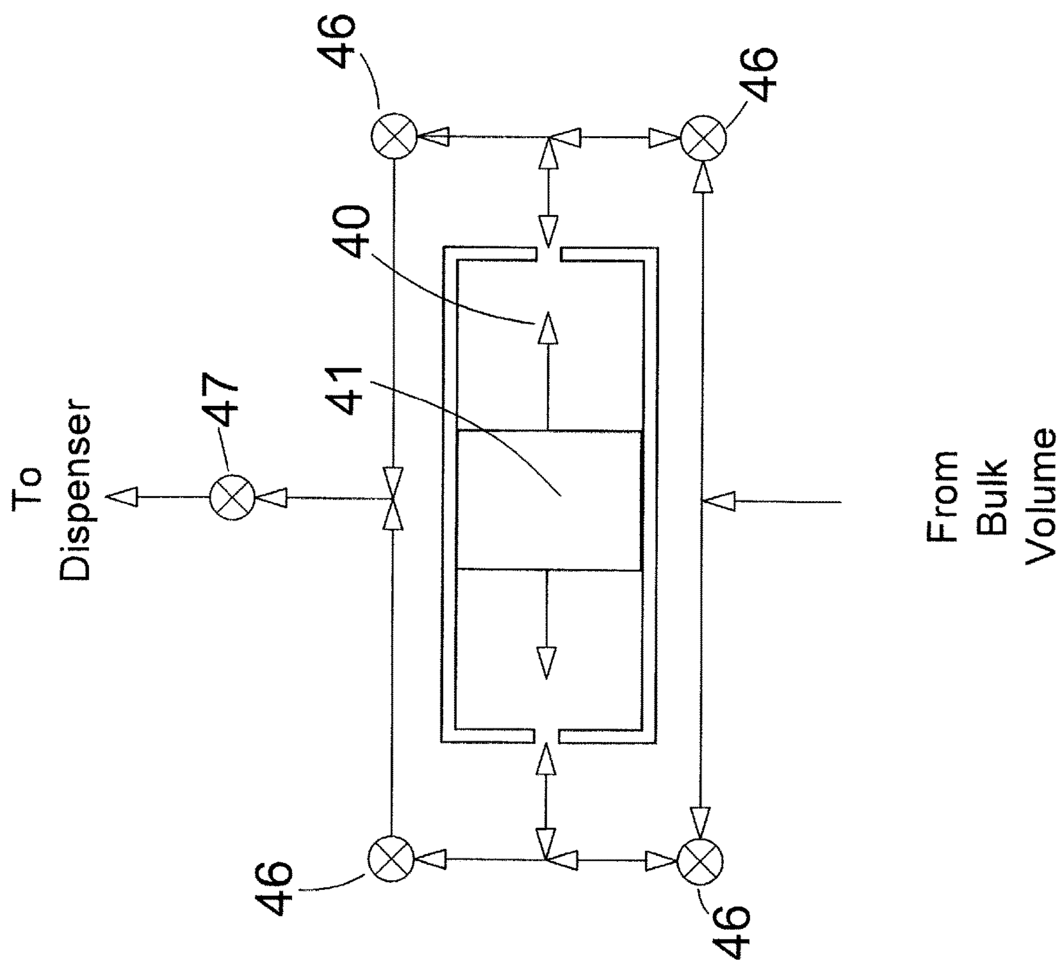
FIG. 13 is a general operational schematic for the operational method of the preferred embodiment of the present invention.

The general operation of the present invention may be most easily described in conjunction with FIG. 13. As shown, fluid from a bulk volume is metered to a dispenser through a metering system formed of a bi-directional metering piston 41 oscillating within a metering chamber 40. With the displacement during a single cycle of the piston 41 being of a known volume, a dispensed fluid volume may be metered through the aggregation of successive displacement volumes. By controlling the valves 46, pressure can be directed and redirected to move the piston to one side or the other, and thereby displacing the fluid at the opposite side. By controlling the cycling of the valves and allowing for hydraulic shoot-through during opening and closing of the valves, the aggregation of successive displacement volumes may be accumulated rapidly enough that the total dispensed pour form the tap appears to be of a single, continuous flow, rather than an intermittent start-stop that would result from other metering configurations.

Figure 14:
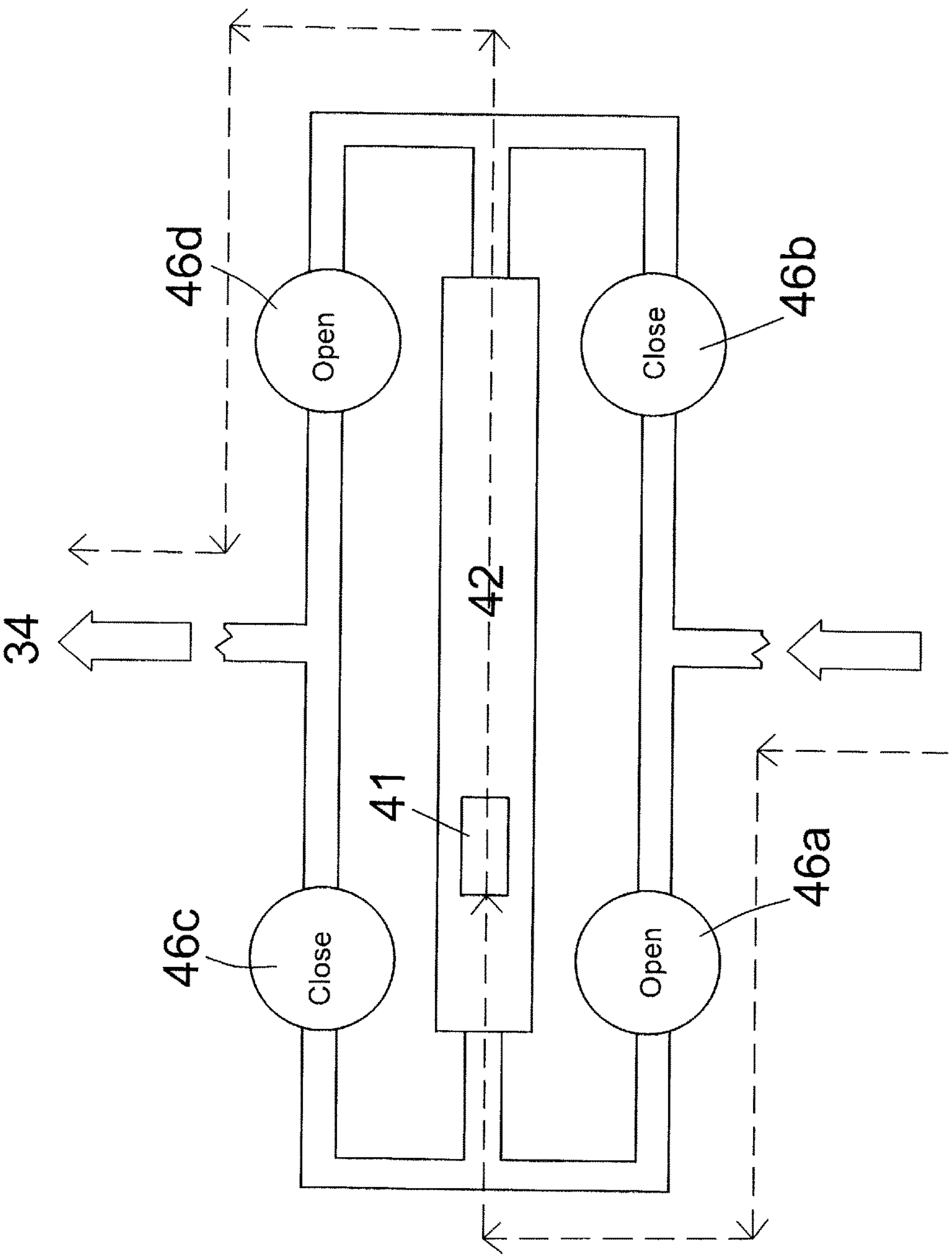
FIG. 14 is a hydraulic schematic of the first exemplary typical operation of a beverage dispensing station 10 for use according to the present invention showing a first dispensing cycle.
Figure 15:
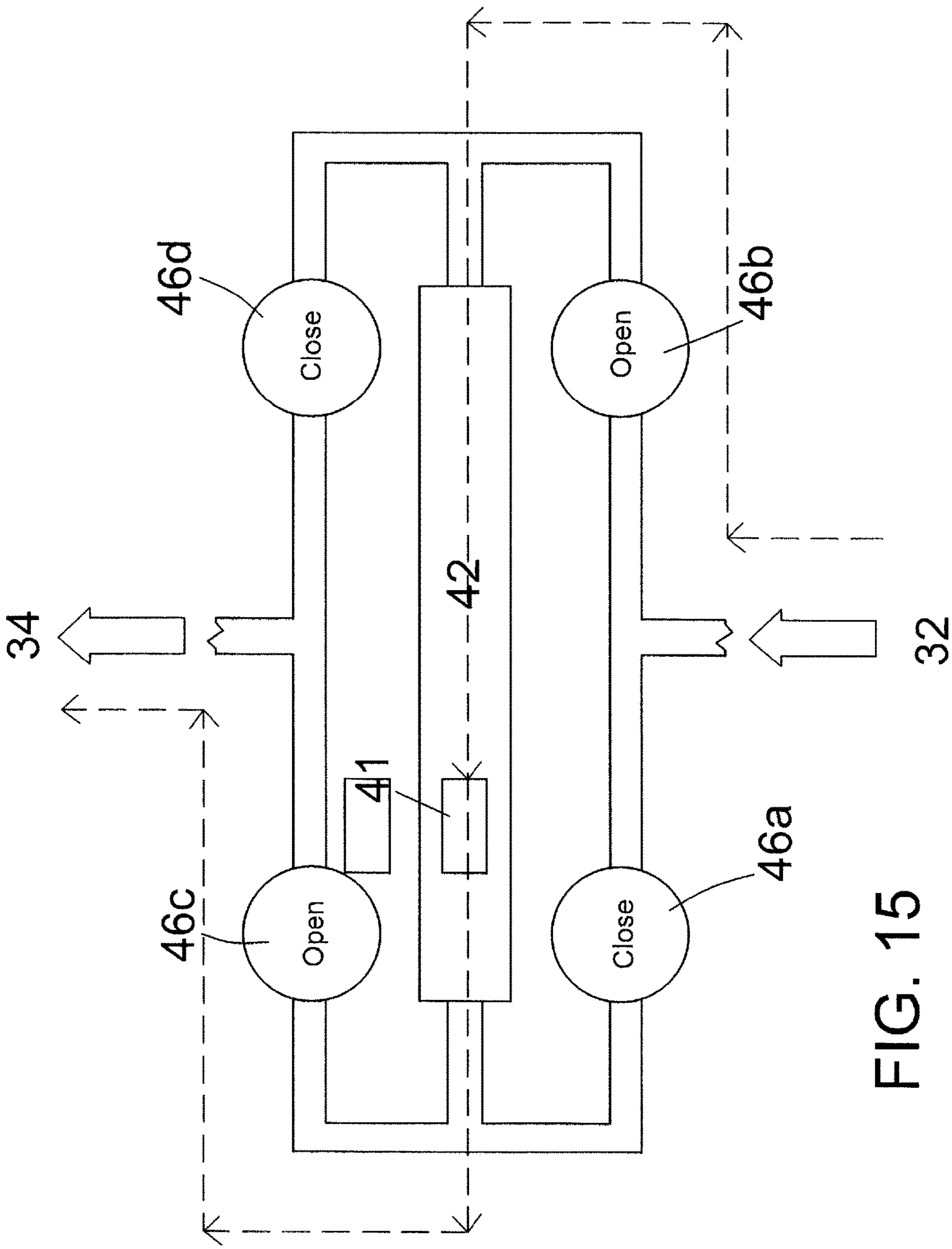
FIG. 15 is a hydraulic schematic of the first exemplary typical operation of a beverage dispensing station 10 for use according to the present invention showing a second dispensing cycle.
Figure 16:
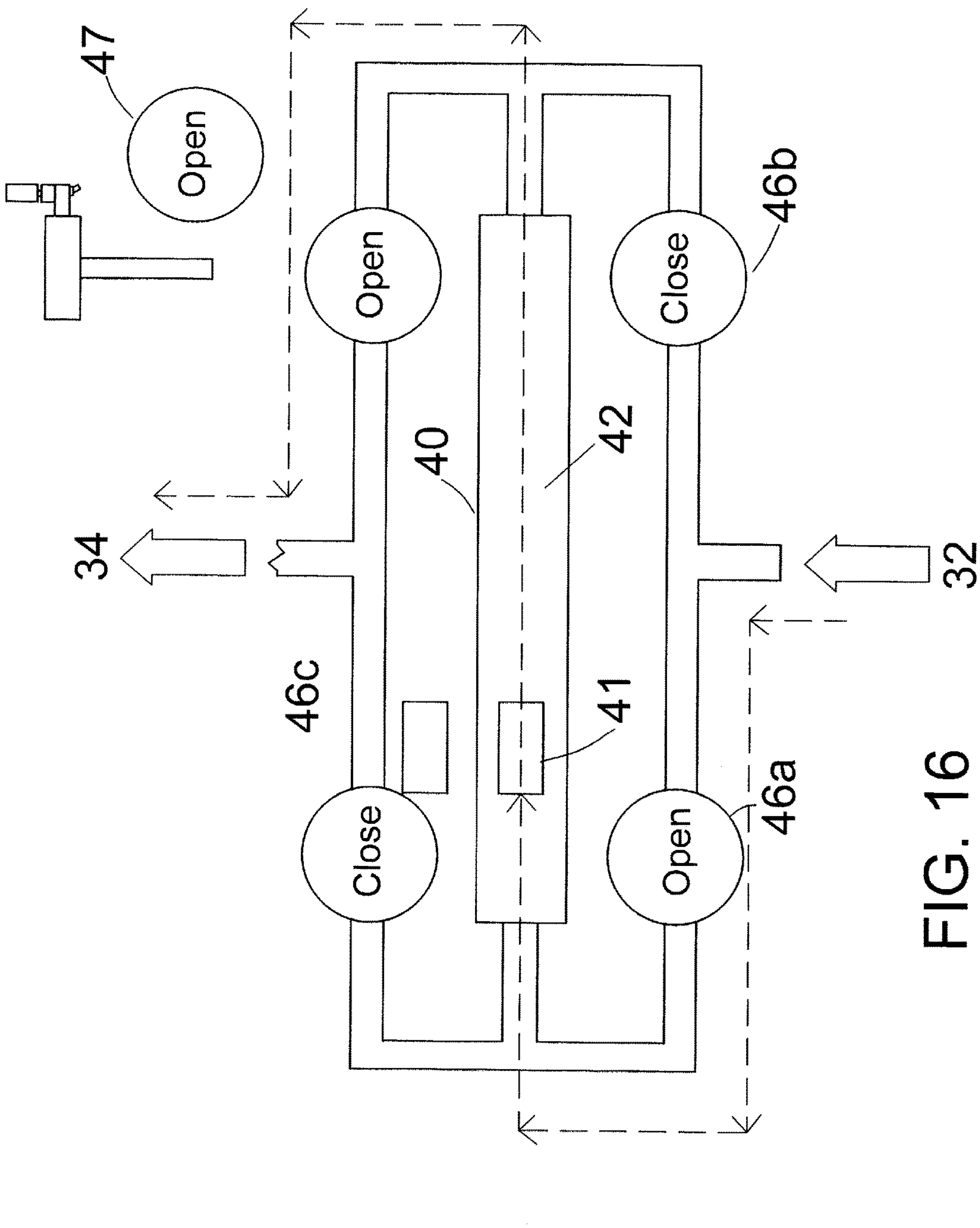
FIG. 16 is a hydraulic schematic of the second exemplary typical operation of a beverage dispensing station 10 for use according to the present invention showing a first dispensing cycle.
Figure 17:
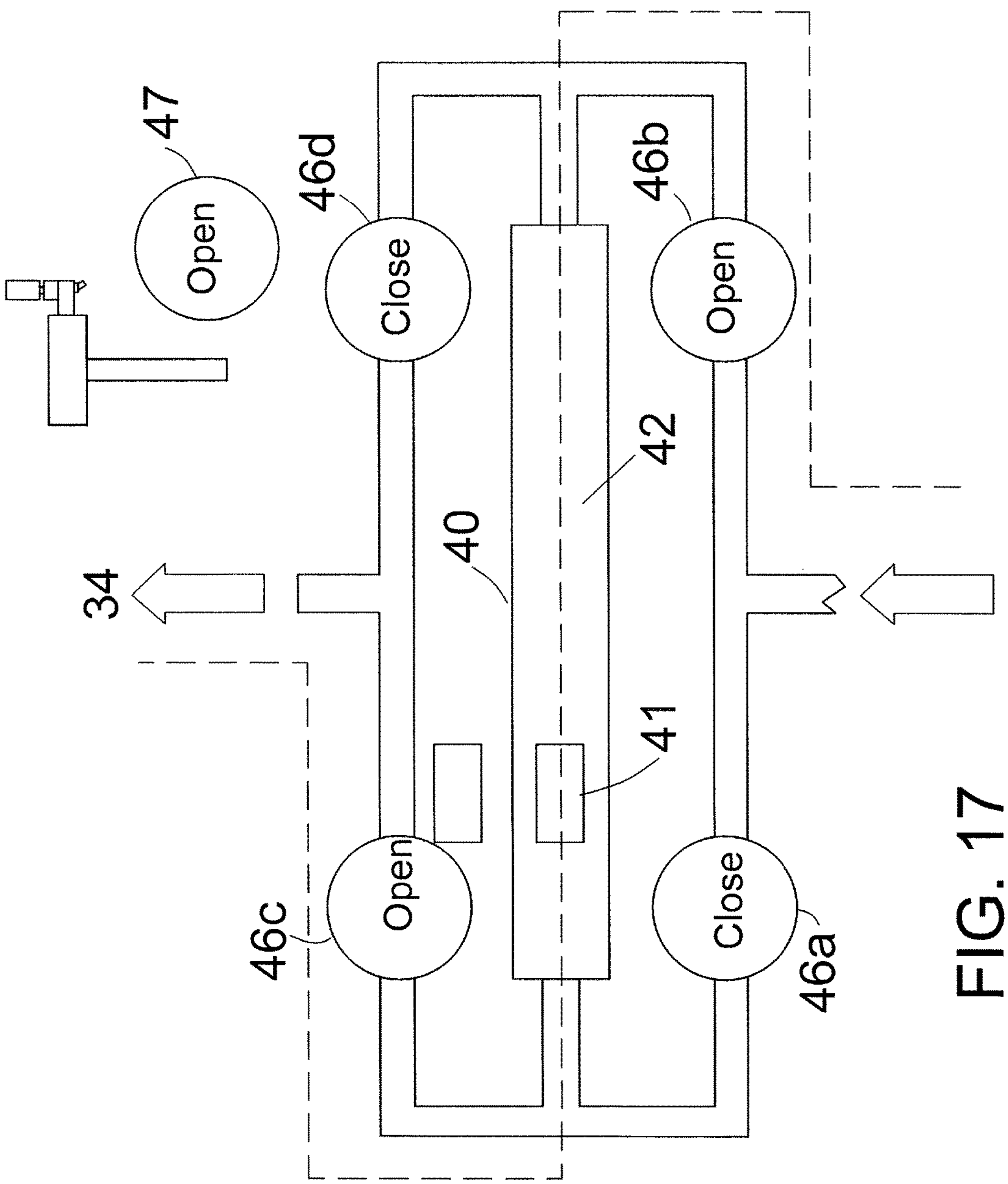
FIG. 17 is a hydraulic schematic of the second exemplary typical operation of a beverage dispensing station 10 for use according to the present invention showing a second dispensing cycle.

Referring in conjunction with FIGS. 14 and 15, a hydraulic schematic of a first exemplary typical operation of a beverage dispensing and pour control system 10 for use according to the present invention is shown. As shown in FIG. 14, a first portion is metered from the inlet 32 under line pressure and directed to a first inlet of the chamber by positioning of one valve 46*a* open and another valve 46*b* closed. Closure of valve 46*c* forces fluid in to the chamber 40 and caused the piston 41 to move from a first position to a second position. The opening of valve 46*d* causes fluid originally in the chamber 40 to be dispensed out through the outlet 34. As shown in FIG. 15, subsequent metered volumes can be discharged by reversal of valve positions 46*a*, 46*b*, 46*c*, and 46*d*. It is envisioned that the valves 46 may be controlled by a dedicated collocated or remote microcontroller. While such a system will maintain volume within the discharge 34 through to the tap or spigot 22, an additional valving mechanism 47 as shown in FIG. 16 and FIG. 17 may be incorporated between the metering chamber 40 and the spigot 22 in order to maintain system pressure throughout the entire system 10. This is accomplished by maintaining the valving mechanism 47 open for the full durations of dispensing of one or several net volume portions until the total desire volume is dispensed; then, at the end of closing all other valves 46 by closing valving mechanism 47 before initiation of the next cycle, i.e. reversal of the valve positions of 46*a-d*, the entire system is pressurized and ready for the next dispensing cycle. To summarize the sequence of events for operation:

a. Valve 47 is opened;

b. Valves 46*a-d* and 46 *b-c* open and close alternately to dispense a number of metered volumes;

c. All valves 46 are closed;

d. Valve 47 is closed; and e. Valves 46 *a-d* (or alternatively 46 *b-c*) are opened for a fraction of second and then closed. It is important to emphasize that the last step (pulsing of the valves) restores the pressure in the line. It is further envisioned that the additional isolation valve 47 may be used to isolate the system's liquid contents from the external environment that would cause spoilage or degradation, or to otherwise prevent the dispensing of foamed beverage for carbonated drinks.

Figure 18:
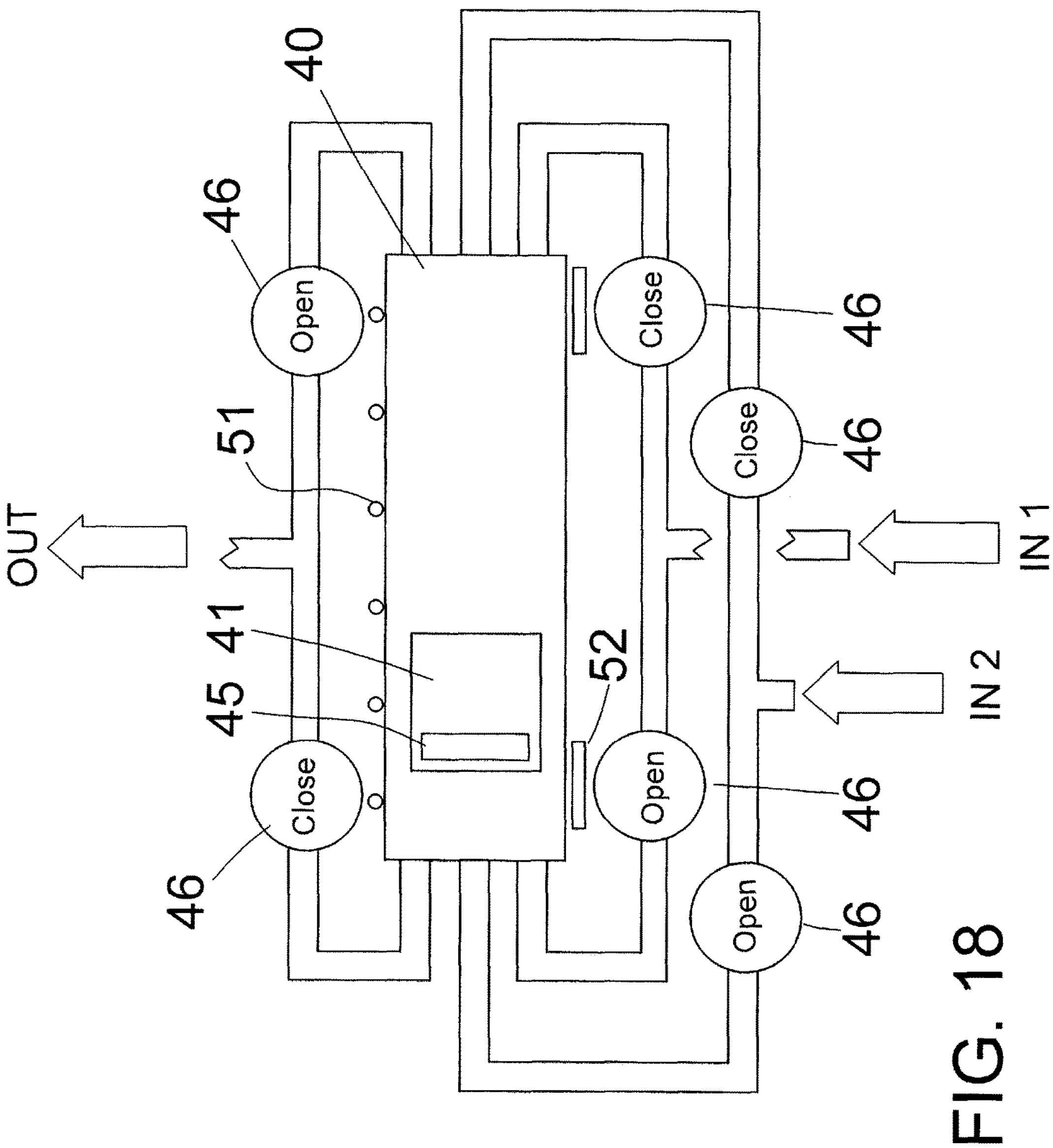
FIG. 18 is a hydraulic schematic of a third exemplary typical operation of a beverage dispensing and pour control system 10 for use according to the present invention is shown in which a single mixed portion is dispensed.
Figure 19:
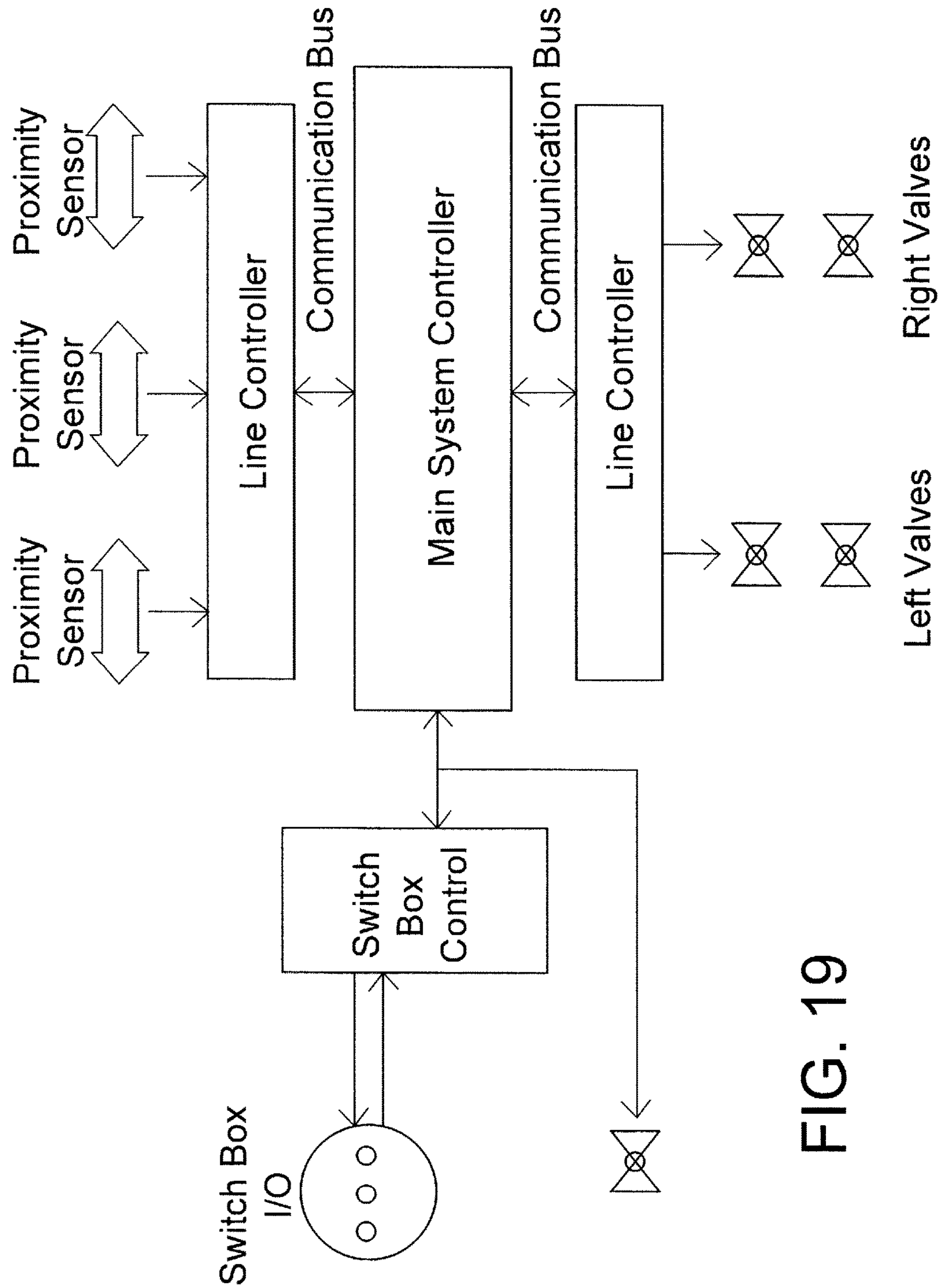
FIG. 19 is a control schematic of a beverage dispensing and pour control system 10 for use with a metering system 20 according to an exemplary preferred embodiment of the present invention.

By way of another example, and not as a limitation, referring now to FIG. 18 a hydraulic schematic of a second exemplary typical operation of a beverage dispensing and pour control system 10 for use according to the present invention is shown in which a sensor mechanism 51 is used to detect the position of the piston 41 or a target 45 within the piston within the chamber 40. In such a configuration, operation of the valves 46 are alternated through communication from sensors. The position of said piston 41 within said chamber 40 is detected with a sensor for detecting proximity. Multiple sensors may be positioned along the length of the metering chamber in order to increase precision of positioning the piston. Such sensors 51/52 may consisting of RF sensors, magnets or halo effect sensors, magnetostrictive, or IR sensors. Such sensors may further be embedded within the chamber such that a sensor target formed in said piston can be quickly, easily, and repeatable detected.

In such a configuration, multiple different input streams are delivered to the metering chamber 40 which then functions additionally as a mixing volume in which fixed volumes of multiple fluid streams are delivered into the chamber 40 at predetermined volumes controlled by opening supply valves at particular times within the movement of the piston 41. As described similarly above, the use of targets and detectors may be utilized for determining the positioning of the piston and controlling the various inlet volumes. In such a variant, the system may be used to automatically meter both the volumes of the individual constituent ingredients of a mixed drink, as well as the overall mixed drink volume.

In operation it is preferable that in a beverage dispensing and pour control system for use with keg wine management should have the ability to control the quality and quantity of servings delivered by the operator. The suggested beverage dispensing and pour control system should also provide precise measurement of each portion, warn the operator about beverage tank low level, force flushing of the poor quality beverage and records all the delivery process events in the log for the management.

Initially the system should be set up in that before the operation, the following parameters may be recorded in the control device memory:

V(t) as the volume of the beverage tank to be dispensed;

V(out) as the volume of the dispensing chamber;

P(low) as percent of the total volume left in the tank to generate the signal; "Low Volume" (usually 10%)

L(in) the length of the input pipe;

D(in) the inner diameter of the input pipe;

L(out) the length of the output pipe;

D(out) the inner diameter of the output pipe;

R(min) the minimal pressure necessary for the normal operation of the dispenser (i.e. a pressure below minimal is to be considered as disconnected line during errant operation or keg supply changeover)

V(st) the standard volume of one portion of the beverage to be delivered to the consumer T(in) the maximum time between the portions for the beverage in the input line to keep its quality (based upon oxidation characteristics of the beverage under operation conditions such as temperature and time)

T(out) the maximum time between the portions for the beverage in the output line to keep its quality During operation, the control unit at the tap/spigot 22 may have several buttons to control the number of portions to be delivered based on the whole system status. The minimum number of buttons is 1; in the presently shown configuration 3 control buttons are shown, marked as:

1) Pour

2) Full [[Flash]] Flush

3) Small (Half) Flash.

Additional buttons like "NewTank" may further be added to the interface for additional automated functionality for operational control. A "New Tank" event can also be detected by measuring and analyzing the time required by the piston to complete its full run along the measuring chamber. In such an operation, short duration piston runs that are caused by the presence of air in the chamber may be used to indicate a New Tank event. Alternatively, a "New Tank" event may also be identified utilizing a special sensor measuring the signature of vibrations inside the line connecting the tank with the measuring chamber. Each button could indicate its readiness, such as, for example, by lighting up an LED. The system may be able to block the operation of certain buttons depending on the current scenario.

By way of example of the normal intended operation, a standard one portion dispensing event requires the push of the button Pour. The operation of the button could be blocked under several conditions, including the time since the last pouring exceeds the predefined safe time T(out) for keeping the beverage in the output line. Additional 'lock out' operation may further be implemented remotely, though command or program configuration by a user from a web portal, cellular connection, or equivalent. In such a scenario the Small Flush button may be activated (steady lighting up or blinking) and the operation of all other buttons can be blocked. Pushing the Small Flush button initiates the system to calculate the number of cycles of delivery station to flash the output line, executes the cycles and unblocks the Pour button. The event is recorded in the log with the time stamp.

The operation of the button could be blocked under other conditions as well. By way of example, and not as a limitation, such as if the time since the last pour exceeds a predefined safe time T(out) for keeping the beverage in the input line. In such a scenario the Full Flash button can be activated (steady lighting up or blinking) and all other buttons are blocked. Pushing the Full Flash button initiates the system to calculate the number of cycles of delivery station to flash the output line, executes the cycles and unblocks the Pour button. The event is recorded in the log with the time stamp.

In its intended configuration and operation the system should calculate inventory and dispensing statistics, such as, but not limited to: the number of cycles of delivery poured; the number of cycles to flash the input and output line (full and small flash); and the instances of low pressure (or supply keg changeover). These events may be recorded in an output report or log with a time stamp.

Additional output report or log events may include when pressure in the input line falls below the minimum required R(min). Such events indicates either and empty beverage tank or a pump failure (compressor broken, power failure, etc.). The operator may resolve such situations by either pressing the Full Flash button after the pump has been repaired or new tanks connected in order to start the new delivery of a new batch. In the latter case the operator enters the New Tank command using button. The control device either records the Full Flash event or completes the last tank report for delivery to the management by request and prepares for the new tank.

Such log reports are important for the operation. Data acquisition can provide valuable inventory information and allow the user to maintain an optimum operational efficiency. By way of example, and not meant as a limitation, such a log report may appear in following format of TABLE 1, or similar, and include information shown and described throughout this describing.

TABLE 1

| | | |
|---|---|---|
| Jun. 15, 2014 | 11:46:35 AM | New Tank |
| Jun. 15, 2014 | 11:46:59 AM | Pressure Normal |
| Jun. 15, 2014 | 11:50:33 AM | Standard Pour |
| Jun. 15, 2014 | 11:51:33 AM | Standard Pour |
| Jun. 15, 2014 | 11:52:33 AM | Standard Pour |
| Jun. 15, 2014 | 3:31:22 AM | Small Flash (4 hr 39 min since last pour) |
| Jun. 15, 2014 | 3:35:22 AM | Standard Pour |
| Jun. 15, 2014 | 3:37:22 AM | Standard Pour |

It should also be noted that a "standard pour" may consist of multiple individual piston cycles, and as such a record log may additional include an indication of the direction of piston travel, dispensed volume, and also cycle time for the travel of the piston.

It should be noted that a beverage dispensing station as described and disclosed above may provide a control device with ability to record such operating and inventory information on a permanent [magnetic] media, or may include a user interface incorporating an LCD display for graphic output as well as for use with a [virtual] keyboard for information exchange between the control device and operator. Additional option may include a wireless board to communicate with a standard PC or smartphone in order to upload records or logs in realtime using the wireless protocol (Bluetooth, Wi-Fi, Internet, etc.) or otherwise remotely reporting operation conditions, report output, alarms or the like.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical,* 520 US 17 (1997) or *Festo Corp.* v. *Shoketsu Kinzoku Kogyo*

*Kabushiki Co.,* 535 U.S. 722 (2002), or other similar caselaw or subsequent precedent should not be made if any future claims are added or amended subsequent to this or any prior parent patent application.

What is claimed is:

1. An apparatus for dispensing a pour of a beverage comprising:

a generally cylindrical metering chamber having a first access at a first end opposite a second access at a second end;

a first input flow control mechanism for controlling a fluid communication between a bulk beverage volume and said first access;

a second input flow control mechanism for controlling a fluid communication between said bulk beverage volume and said second access;

a first output flow control mechanism for controlling a fluid communication between said first access and a dispenser;

a second output flow control mechanism for controlling a fluid communication between said second access and said dispenser;

a reciprocating piston retained within said cylindrical metering chamber for sliding between said first access and said second access in a manner such that said first access and said second access are continuously hydrodynamically coupled and wherein movement toward said first access allows fluid access to said metering chamber through said second access and movement toward said second access allows fluid access to said metering chamber through said first access;

wherein an uninterrupted continuous output flow of said beverage fluid is provided by selectively operating said input control mechanisms and output control mechanisms in a sequentially overlapping manner to create a smooth, continuous fluid flow to a dispenser.

2. The apparatus of claim 1, wherein a speed or a position of said reciprocating piston is monitored for controlling operation of said input control mechanisms and said output control mechanisms.

3. The apparatus of claim 2, wherein said apparatus further comprises:

at least one sensor for detection of the position, a location or the speed of said reciprocating piston.

4. The apparatus of claim 3, wherein said sensor comprises:

a detector for sensing the position, location or speed of a target along a reciprocating path within the cylindrical metering chamber; and said target incorporated within said piston.

5. The apparatus of claim 4, wherein said detector comprises more than one proximity sensor and said target comprises a detectable surface of said piston.

6. The apparatus of claim 4, wherein said proximity sensor comprises an IR proximity sensor.

7. The apparatus of claim 4, wherein said detector comprises a Hall-effect sensor and said target comprises a magnet incorporated with said piston.

8. The apparatus of claim 7, wherein a plurality of Hall effect sensors are aligned along said generally cylindrical metering chamber for detecting an incremental position of said piston within said metering chamber.

9. The apparatus of claim 6, wherein a plurality of IR proximity sensors are aligned along said generally cylindrical metering chamber for detecting an incremental position of said piston within said metering chamber.

10. The apparatus of claim 3, wherein said metering chamber is of a selected fixed volume and multiple fractional incremental discharges from said metering chamber forms a selected dispensed volume.

11. The apparatus of claim 10, further comprising a microprocessor for receiving input from said sensors and controls said control mechanisms.

12. The apparatus of claim 10, further comprising:

a back pressure control mechanism near said dispenser for maintaining a desired elevated pressure for maintaining carbonation within said beverage.

13. The apparatus of claim 12, wherein said back pressure control mechanism comprises a controllable valve in combination with a spigot or tap.

14. The apparatus of claim 12, wherein said back pressure control mechanism comprises a check valve in combination with a spigot or tap.

15. The apparatus of claim 11, wherein a speed and a position of said piston are used to calculate an anticipated volumetric discharge from said metering chamber.

16. The apparatus of claim 15, wherein selected fractional dispensed volumes are monitored and controlled for creating a dispensed pour volume.

17. A beverage metering and control apparatus comprising:

a generally elongated metering chamber forming a hydraulically continuous volume;

a laterally movable piston contained within said metering chamber for reciprocating with a direction of a controlled fluid flow within said volume;

a series of piston position sensors along linearly along said metering chamber;

a position detector for detecting said series of piston position sensors;

a control mechanism for controlling input to and output from each end of said metering chamber in a manner that allows the piston to change direction prior to contacting a terminus of said metering chamber; and a microprocessor for receiving said input and for initiating said output in a manner that is adapted to control a movement of said piston in a manner so as to provide a continuous fluid flow to a dispensing spigot.

18. The beverage metering and control system of claim 17, wherein said continuous fluid flow is provided through a plurality of fractional volumetric discharges from said metering chamber in a manner such that input to and output from said metering chamber are coordinated in a controlled manner to prevent detectable disruption in said contiguous fluid flow.

19. The beverage metering and control system of claim 18 wherein said position sensors are selected from the group consisting of: RF sensors; IR sensors; and hall effect sensors.

20. A beverage metering and control system comprising:

a metering chamber of a fixed, selected volume, said metering chamber forming a first access in continuous fluid communication with a second access;

a movable piston contained within said metering chamber in a manner that maintains hydrodynamic continuity within said volume;

a series of piston position sensors aligned linearly along an said metering chamber;

a position sensor detector for each said series of piston position sensors;

at least one control valve for controlling input to said first access and said second access;

at least one control valve for controlling output from said first access and said second access; and a microprocessor for receiving input from said position sensor detectors and for initiating a control signal to said control valves to actuate said control valves to provide a non-discontinuous fluid flow to a dispensing spigot.

21. The beverage metering and control system of claim 20, wherein detection of an incremental position of said piston within said metering chamber is used to control said control valves to move said piston in a manner such as to provide for any number of fractional volumetric increments to provide a specific selected volumetric discharge in fluid communication with a tap or spigot that provides for a beverage to be discharged in a continuous, controlled and metered manner into a drinking container that is coordinated with the beverage being discharged.

22. The beverage metering and control system of claim 21, further comprising a metering mechanism operatively utilizes pressure from a bulk storage as a motive force while maintaining a system pressure within said beverage metering and control system.

23. A method for operating the apparatus of claim 22, wherein said non-discontinuous fluid flow to said dispensing spigot is provided by control of said metering mechanism such as to manage said control valves in a selective manner such as to coordinate metering chamber inputs and metering chamber output to provide said non-discontinuous fluid flow to a dispensing spigot.

24. The method for operating the apparatus of claim 23, wherein control of said piston is results in an approximately fraction of or multiple of a volume of said metering chamber such as to comprise a desired total beverage pour volume in a manner such that input to and output from said metering chamber are coordinated in a controlled manner to prevent detectable disruption in said contiguous fluid flow.

* * * * *